Patented Jan. 9, 1951

2,537,017

UNITED STATES PATENT OFFICE 2,537,017

COATING COMPOSITIONS

Gerald R. Barrett, Winchester, Mass., assignor to Monsanto Chemical Company, St. Louis, Mo., a corporation of Delaware No Drawing. Application May 29, 1948,
Serial No. 30,215

14 Claims. (Cl. 260—45.2)

This application is a continuation-in-part of my application Serial No. 719,136, filed December 28, 1946, now abandoned.

The present invention relates to improved coating compositions for surface finishing flexible base materials such as fabrics, paper, impregnated paper and the like and to articles coated with a film formed from such coating compositions. It more particularly relates to improved coating compositions which are especially adapted for surface finishing flexible base materials such as artificial leather backing, rug backing, light weight fabrics and the like.

It is one object of the present invention to provide economical and improved coating compositions which are especially adapted for surface coating flexible bases, such as cloth and paper, with a tough, yet highly flexible, substantially non-tacky film which is water-resistant, stain-resistant and the like. A further object of the present invention is to provide economical and improved coating compositions for rug backings.

A further object of the present invention is to provide improved coating compositions which are especially adapted for coating light weight fabrics.

A further object of the present invention is to provide improved artificial leather finishes.

Still further objects and advantages of the invention will appear from the following description and the appended claims.

The present invention provides coating compositions comprising as essential film-forming materials: (1) polyvinyl butyral; and (2) a copolymer of a secondary alkyl half ester of an ethylene $\alpha,\beta$-dicarboxylic acid with a polymerizable vinyl compound having the general formula: R—CH=CH$_2$, where R is a phenyl, halogen substituted phenyl or methyl substituted phenyl radical. In addition to the foregoing film-forming materials, such compositions also contain suitable plasticizers which are compatible with such materials and a mutual solvent or solvents for such film-forming materials and plasticizers. The coating compositions of the present invention may also comprise suitable adjuvants such as pigments, dyes, delustrants, cross-linking agents, other film-forming materials or the like.

The coating compositions of the present invention dry down to tough, highly flexible and distensible films which are substantially non-tacky. When such compositions are applied to fabric, paper, rubber impregnated paper and other flexible bases having substantially similar characteristics and then dried, an excellent adhesion of the film to the fabric surface is effected. The properties of the coating formed from the compositions of the invention are not materially affected by aging, i. e., by prolonged periods of standing or use. On the other hand, some properties of the coating such as resistance to chemical attack, solvents and the like are actually improved under such conditions which indicates that the film-forming materials undergo at least a mutual reaction or are cross-linked in some manner. This phenomenon can be markedly accelerated by adding to such compositions, before applying the coating, a small proportion of a compatible thermosetting resin such as a urea-formaldehyde resin, melamine-formaldehyde resin, methylated melamine-formaldehyde resin and the like. The coating formed from such composition can be dried down in a normal manner, e. g., at ordinary drying temperatures, or it can be cured after it is substantially dry by heating it to relatively high temperatures as, for example, 225° to 300° F., for a short period of time. In the latter procedure a mutual reaction or cross-linking of the film-forming materials is effected in from about 1 to 10 minutes depending on the temperature employed.

The copolymers which are employed in the above coating compositions may be prepared in various ways. In general, they are prepared by copolymerizing a higher secondary alkyl half ester of an ethylene $\alpha,\beta$-dicarboxylic acid, in which the alkyl group contains from 4 through 12 carbon atoms, and, preferably from 6 through 10 carbon atoms, with styrene, halogen-substituted styrenes such as nuclear substituted chlor-styrene and dichlor-styrene and methyl substituted styrenes such as nuclear substituted methyl styrene and dimethyl styrene, although styrene is preferably employed. Such alkyl half esters and styrene or substituted styrenes are generally copolymerized in a molal ratio of about 1:1.0 to 1:2.0, and preferably, in a molal ratio of about 1:1.1 to 1:1.5.

As examples of such secondary alkyl half esters of ethylene $\alpha,\beta$-dicarboxylic acids which are suitable for use in the preparation of the above copolymers may be mentioned sec-butyl acid maleate, methyl isobutyl carbinyl acid maleate, methyl amyl carbinyl acid maleate, methyl hexyl carbinyl acid maleate, methyl heptyl carbinyl acid maleate, methyl decyl carbinyl acid maleate and the like and the corresponding acid fumarates. Those which are preferably employed in preparing the copolymers used in the coating compositions of the present invention are those secondary alkyl acid maleates which contain from 6 through 10 carbon atoms in the alkyl group, or mixtures of such maleates. They are preferably prepared by reacting the appropriate secondary monohydric alcohol as, for example, methyl isobutyl carbinol with maleic anhydride in a molal ratio of from about 1:1.0 to 1:1.5, although a slightly larger ratio of anhydride may be employed, until the ester has a substantially constant acid value on continued heating.

Various well-known polymerization methods may be employed in carrying out the preparation of the above described copolymers depending upon the mutual solubility of the monomeric reactants. Thus, if the monomers are mutually soluble as in the case of secondary alkyl esters of maleic acid and styrene, the mass polymerization method may be employed. In this method the reactants are in general copolymerized at temperatures between about 100° to 300° F. for several hours or more, usually in the presence of a peroxide catalyst such as benzoyl peroxide.

Emulsion polymerization methods may be employed or the copolymers may be prepared by the so-called solvent process which involves copolymerizing the monomeric reactants in the presence of a solvent which is capable of dissolving the monomers and the copolymerizate. The copolymer, which is precipitated after the reaction, for example, by the addition of a diluent is then separated from the solvent and the unreacted monomers by filtration, centrifuging or the like.

Depending upon the mode of application, the base material to be coated and the nature of the coating, i. e., whether it is to be a base or top coat, the coating compositions of the present invention comprise, in general, from about 12 to 35% by weight and preferably about 18 to 32% by weight of the essential film-forming materials, namely, polyvinyl butyral and the above copolymers; from about 10 to 110% by weight, based on said film-forming materials, of a compatible plasticizer therefor; from zero to about 50% by weight, based on said film-forming materials of a pigment, flatting agent or the like; and from zero to about 2% by weight of a thermosetting resin which is capable of cross-linking the above film-forming materials. The above materials are present in the composition in amounts sufficient to provide between about 20 to 55% by weight of total solids, the remainder of the composition being an organic solvent as, for example, a low-boiling or medium-boiling organic solvent which is a mutual solvent for the foregoing ingredients, or a mixture of such solvents. In general, when the compositions are employed for top coating a previously coated fabric, they generally contain a quantity of essential film-forming materials which is closer to the lower limit of the percentages given above. The above percentages are, of course, capable of being varied depending upon the desired coating, film thickness, film flexibility, etc., and depending also upon the properties desired in the coating, as will be apparent to those skilled in the art.

The polyvinyl butyral and the above described copolymers are preferably employed on a substantially equal weight basis. However, they are also employed in ratios of polyvinyl butyral to copolymer varying between about 70 parts:30 parts and 30 parts:70 parts by weight. Again, other ratios may be used as will be apparent to those skilled in the art.

A further understanding of the advantages of the coating compositions of the present invention and uses therefor will be obtained from the following examples, which are intended to be illustrative, but not limitative of the scope of the invention, parts and percentages being by weight unless otherwise specified.

*Example I*

A copolymer (hereinafter referred to as copolymer X) was prepared as follows:

One molecular proportion of methyl isobutyl carbinol was reacted with 1.1 molecular proportions of maleic anhydride at a temperature of about 80° C. until the product had a substantially constant acid value (as determined by titration of an aliquot portion) on continued heating. The resulting mass was then copolymerized with about 1.4 molecular proportions of styrene in the presence of about 0.002 molecular proportions of benzoyl peroxide by heating the monomers at a temperature of about 65° C. during the period of rapid heat evolution. The temperature was then raised to about 120° C. until the copolymerization reaction was completed. The viscosity of 0.2 gram of the resulting resin in 10 c. c. of cyclohexanone was 0.42 cps. at 25° C.

Coating composition A:

|  | Parts |
| --- | --- |
| Toluene | 130 |
| Isopropanol (91% by volume) | 130 |
| Butyl ricinoleate (plasticizer) | 60 |
| Copolymer X | 50 |
| Polyvinyl butyral | 50 |

The resulting coating composition had a viscosity of about 1500 cps. and contained about 38% solids (including plasticizer).

The above composition was coated on an artificial leather backing (rubber impregnated paper) using a conventional rubber spreader. On drying the coated backing at 110° F., a tough, yet highly flexible coating having excellent adhesion and distensibility was obtained. The artificial leather so produced had high gloss and good pliability, while the coating thereon possessed a greater strength and hardness than a comparable polyvinyl butyral coating and in addition was substantially non-tacky.

Coating composition B:

|  | Parts |
| --- | --- |
| Toluene | 160 |
| Isopropanol (91% by volume) | 160 |
| Polyvinyl butyral | 50 |
| Di(butoxy ethyl) phthalate (plasticizer) | 60 |
| Titanium dioxide | 50 |
| Copolymer X | 50 |

The above coating composition had a viscosity of about 1600 cps. and contained about 40% solids.

This composition was coated on an artificial leather backing (rubber impregnated paper) using a conventional rubber spreader. The coated article was then dried at about 120° F. to drive off volatile solvents. The coating had substantially the same properties as that obtained from composition A above, but had considerably less gloss due to the pigment contained therein.

If desired, a coating having high gloss characteristics can be applied over the above coatings by employing a clear coating composition containing essentially the same ingredients without a pigment and using only a relatively small quantity of plasticizer as, for example, about 20 to 30% plasticizer based on the film-forming materials present. An example of such a composition is the following:

Coating composition C:

| | Parts |
|---|---|
| Polyvinyl butyral | 50 |
| Toluene | 95 |
| Isopropanol (91% by volume) | 95 |
| Butyl ricinoleate | 15 |
| Di(butoxy ethyl) phthalate | 10 |
| Copolymer X | 50 |

The foregoing compositions may also comprise a small proportion, say about 0.2 to 2% based on the total composition, of an alcohol-soluble thermosetting resin such as an alcohol-soluble methyl ether of methylol melamine, for example, trimethoxymethyl melamine, a methyl ether of methylol urea, and the like. When such thermosetting resins are employed in the above coating compositions, the coating formed therefrom can be readily cured, for example, by heating the coated article to a temperature of about 250° F. for a period of 5 to 6 minutes. The coating thus formed and cured is more highly resistant to chemical and solvent attack than the same coating without the thermosetting resin. Generally, there is sufficient free acid present in the copolymer to catalyze the curing of the coating when such thermosetting resins are employed. However, small amounts of an organic acid catalyst such as tartaric acid, oxalic acid, citric acid and the like can be incorporated in such compositions to insure fast curing of the coating. If desired, the curing may be carried out without heating and without the use of a catalyst, but in such case the curing requires a considerably longer period of time.

*Example II*

Coating composition D:

| | Parts |
|---|---|
| Toluene | 135 |
| Isopropanol (91% by volume) | 70 |
| Special denatured alcohol No. 1 | 70 |
| Polyvinyl butyral | 50 |
| Butyl ricinoleate | 80 |
| Tri(methoxy methyl) melamine | 5 |
| Copolymer X (prepared as in Example I) | 50 |

The above coating composition was applied to a light weight cotton fabric by knife coating and the coated fabric was heated at about 110° F. until substantially all of the solvent in the coating had evaporated. The fabric was then coated with two additional coats of the same coating composition by a similar procedure. The coated fabric possesses excellent drape and the coating thereon provides an excellent base for top finishing coats.

Coating composition E:

| | Parts |
|---|---|
| Isopropanol (91% by volume) | 50 |
| Special denatured alcohol No. 1 | 50 |
| Toluol | 105 |
| Polyvinyl butyral | 50 |
| Butyl ricinoleate | 50 |
| Di(butoxy ethyl) phthalate | 50 |
| Tri(methoxy methyl) melamine | 5 |
| Copolymer X (as prepared in Example I) | 50 |

The resulting coating composition was applied to a light weight cotton fabric by the general procedure described above except that only two coats were applied. The coated fabric had excellent draping characteristics and the coating thereon provides an excellent base for a subsequent top finishing coat or coats.

Coating composition F:

| | Parts |
|---|---|
| Isopropanol (91% by volume) | 210 |
| Toluol | 210 |
| Polyvinyl butyral | 50 |
| Butyl ricinoleate | 10 |
| Tri(methoxyl methyl) melamine | 5 |
| Copolymer X (prepared as described in Example I) | 50 |

The above composition was applied by knife coating to the fabric coated with composition D, above, as a top coating therefor. The fabric was then dried at about 120° F. until substantially all of the solvent was evaporated from the coating. A second coating was then applied and dried in a similar manner, after which, the fabric was heated at about 250° F. for about 6 minutes to cure and cross-link the film-forming materials in the coating. The resulting fabric had an excellent drape and feel, and was substantially non-tacky. The coating was highly flexible and distensible. Moreover, it was harder and possessed greater strength than a plasticized polyvinyl butyral coating.

Coating composition G:

| | Parts |
|---|---|
| Toluol | 265 |
| Isopropanol (91% by volume) | 265 |
| Polyvinyl butyral | 50 |
| Copolymer X | 50 |
| Butyl ricinoleate | 25 |
| Di(butoxy ethyl) phthalate | 25 |
| Tri(methoxy methyl) melamine | 5 |
| Silica aerogel (flatting agent) | 50 |

This top coating was applied by knife coating to the fabric coated with composition E and then dried and cured in the same manner as coating composition F. The resulting coated fabric had excellent drape and feel and was substantially non-tacky. The coating was very flexible and distensible and possessed greater strength than a conventional polyvinyl butyral coating. Moreover, the cured coating was not soluble in the solvents originally employed in the compositions.

*Example III*

A copolymer (hereinafter referred to as copolymer Y) was prepared as follows:

About one molecular proportion of secondary octyl alcohol (methyl hexyl carbinol) was reacted with about 1.1 molecular proportions of maleic anhydride at a temperature of 70° C. until the product had a substantially constant value on continued heating. The resulting mass was then copolymerized with about 1.5 molecular proportions of styrene in the presence of about 0.003 molecular proportions of benzoyl peroxide and at a temperature of about 80° C. during the period of rapid heat evolution. The temperature was then raised to 125° C. until the copolymerization reaction was completed.

Coating composition H:

| | Parts |
|---|---|
| Isopropanol (91% by volume) | 144 |
| Petroleum naphtha (with a distillation range of 105–250° F. and a specific gravity of about 0.69) | 96 |
| Polyvinyl butyral | 50 |
| Butyl ricinoleate | 30 |
| Copolymer Y | 50 |

Coating composition J:

| | Parts |
|---|---|
| Isopropanol (91% by volume) | 112 |
| Toluol | 112 |
| Polyvinyl butyral | 60 |
| Copolymer Y | 40 |
| Di(butoxy ethyl) phthalate | 25 |
| Butyl ricinoleate | 25 |

Coating composition K:

| | Parts |
|---|---|
| Isopropanol (91% by volume) | 140 |
| Toluol | 140 |
| Di(butoxy ethyl) phthalate | 50 |
| Copolymer Y | 30 |
| Polyvinyl butyral | 70 |

The above compositions were applied individually to separate pieces of rug backing using a conventional rubber spreader and the coated backings were then heated at about 115° F. until substantially all of the solvent had evaporated. The resulting coated articles possessed excellent flexibility without cracking and had a very low burning rate as compared to rug backings coated with nitrocellulose compositions. The coatings were extremely tough and possessed excellent adhesion to the backing.

As described in Examples I and II, a small proportion of a thermosetting resin may be incorporated in the foregoing compositions to cross-link or cure the coatings formed therefrom. However, when coating compositions of the type described in the present invention are applied to rug backing, it is not usually necessary to cure or cross-link the resulting coating although this may be done if desired.

In place of the solvents used in the foregoing examples other low-boiling or medium-boiling solvents may be used. As examples of these may be mentioned methanol, denatured alcohol, propanol, 2-butanol, diacetone alcohol and other alcohols; low-boiling esters such as ethyl acetate, butyl acetate and the like; low-boiling solvent mixtures such as alcohol-aromatic hydrocarbon mixtures as, for example, denatured alcohol-toluol, ethanol-toluol and the like; low-boiling solvent mixtures such as alcohol-aliphatic hydrocarbon or alcohol-petroleum naphtha mixtures as, for example, alcohol-rubber solvent, propanol-rubber solvent, ethanol-hexane and heptane mixtures, propanol-hexane and heptane mixtures and the like, or other solvents or solvent mixtures of a similar nature. In general, when solvent mixtures such as monohydric-alcohol-aromatic hydrocarbon mixtures are employed, the alcohol generally comprises from about 30% to approximately 100% of the mixture, and preferably comprises from about 40 to 60% of the mixture. Solvent mixtures of the alcohol-aliphatic hydrocarbon or alcohol-petroleum naphtha type, on the other hand, in general contain from about 45% to approximately 100% of alcohol. Other suitable solvents and solvent mixtures of substantially similar characteristics will be apparent to those skilled in the art.

The plasticizers described in the foregoing examples and description may be replaced in whole or in part by suitable compatible plasticizers such as diglycol ricinoleate, glyceryl mono-oleate, glyceryl di-oleate, dimethoxy ethyl phthalate, nonaethylene glycol monoleate, di(2-ethoxy ethyl) phthalate, the diester of phthalic anhydride and diethylene glycol ethyl ether, glyceryl monoricinoleate, tricresyl phosphate, methyl phtalyl ethyl glycollate, ethyl phthalyl ethyl glycollate, triglycol dioctoate, 2-methoxy methyl ricinoleate and the like or mixtures thereof.

The polyvinyl butyral employed in the above examples was prepared by condensing butyraldehyde with a partially hydrolyzed polyvinyl acetate and contains on a weight basis: 17–20% hydroxy groups calculated as polyvinyl alcohol, less than 3% acetate groups calculated as polyvinyl acetate and the balance substantially butyraldehyde acetal. Instead of the specific polyvinyl butyral described above other polyvinyl butyrals having lower hydroxy contents, higher acetate contents and/or lower viscosity characteristics may be employed. In general, the properties of the plasticized polyvinyl butyral film such as extensibility, hardness, plasticity, tackiness and the like will depend to a certain extent on the particular polyvinyl butyral used and will also depend on the method employed in preparing such polyvinyl butyral. For these reasons, it will be apparent that some modifications in the above described compositions may be made depending upon the characteristics of the polyvinyl butyral that is employed therein.

The coating compositions of the present invention may contain pigments and flatting agents other than those described in the above examples. Suitable pigments include carbon black, mineral pigments, azo pigments, lakes and the like. Flatting agents which are suitable include diatomaceous earth, bentonite aerogels, silica organosols and the like.

In addition to the uses hereinbefore described, the coating compositions of the present invention may also be employed as a floc adhesive in the manufacture of artificial pile fabrics.

What is claimed is:

1. A coating composition for flexible surfaces comprising as essential film forming materials: (1) polyvinyl butyral; and (2) a copolymer consisting of the copolymerization product of a secondary alkyl half ester of an ethylene $\alpha,\beta$-dicarboxylic acid selected from the group consisting of maleic and fumaric acids, wherein the alkyl radical contains from 6 to 10 carbon atoms, and styrene, said half ester and styrene being copolymerized in a molal ratio between 1:1 and 1:2; and a plasticizer for said film-forming materials.

2. A coating composition for flexible surfaces comprising as essential film-forming materials: (1) polyvinyl butyral; and (2) a copolymer consisting of the copolymerization product of a secondary alkyl half ester of maleic acid, in which the alkyl group contains from 6 to 10 carbon atoms, and styrene, said half ester and styrene being copolymerized in a molal ratio between 1:1 and 1:2; and a plasticizer and a solvent for said film-forming materials.

3. A coating composition for flexible surfaces comprising from about 12 to 35% by weight of a mixture of (1) polyvinyl butyral and (2) a copolymer consisting of the copolymerization product of a secondary alkyl half ester of maleic acid, in which the alkyl group contains from 6 to 10 carbon atoms, and styrene, said half ester and styrene being copolymerized in a molal ratio between 1:1 and 1:2; from about 10 to 110% by weight, based on said mixture of a plasticizer for said butyral and copolymer; and a solvent for the foregoing ingredients.

4. A coating composition substantially as set forth in claim 3, but characterized in that the copolymer is a copolymer consisting of the copolymerization product of methyl isobutyl carbinyl half ester of maleic acid and styrene.

5. A coating composition substantially as set forth in claim 3, but characterized in that the copolymer is a copolymer consisting of the copolymerization product of a methyl amyl carbinyl half ester of maleic acid and styrene.

6. A coating composition substantially as set forth in claim 3, but characterized in that the copolymer is a copolymer consisting of the copolymerization product of a methyl hexyl carbinyl half ester of maleic acid and styrene.

7. A flexible base material coated on at least one surface thereof with a film comprising polyvinyl butyral; a copolymer consisting of the copolymerization product of a secondary alkyl half ester of maleic acid, wherein the alkyl group contains from 6 to 10 carbon atoms, and styrene, said half ester and styrene being copolymerized in a molal ratio between 1:1 and 1:2; and a plasticizer for said butyral and copolymer.

8. A flexible base material coated on at least one surface thereof with a film comprising polyvinyl butyral; a copolymer consisting of the copolymerization product of a methyl isobutyl carbinyl half ester of maleic acid and styrene, said half ester and styrene being copolymerized in a molal ratio between 1:1 and 1:2; and a plasticizer for said butyral and copolymer.

9. A flexible base material coated on at least one surface thereof with a film comprising polyvinyl butyral; a copolymer consisting of the copolymerization product of a methyl amyl carbinyl half ester of maleic acid and styrene, said half ester and styrene being copolymerized in a molal ratio between 1:1 and 1:2; and a plasticizer for said butyral and copolymer.

10. A flexible base material coated on at least one surface thereof with a film comprising polyvinyl butyral; a copolymer consisting of the copolymerization product of a methyl hexyl carbinyl half ester of maleic acid and styrene, said half ester and styrene being copolymerized in a molal ratio between 1:1 and 1:2; and a plasticizer for said butyral and copolymer.

11. A coating composition for flexible surfaces comprising as essential film-forming materials: (1) polyvinyl butyral; and (2) a copolymer consisting of the copolymerization product of a secondary alkyl half ester of an ethylene $\alpha,\beta$ dicarboxylic acid selected from the group consisting of maleic and fumaric acids, wherein the alkyl group contains from 4 to 12 carbon atoms, and a polymerizable vinyl compound having the general formula: $R-CH=CH_2$, where R is a radical selected from the group consisting of phenyl, halogen substituted phenyl and methyl substituted phenyl radicals, said half ester and said vinyl compound being copolymerized in a molal ratio between 1:1 and 1:2; and a plasticizer for said film-forming materials.

12. A flexible base material coated on at least one surface thereof with a film comprising polyvinyl butyral; a copolymer consisting of the copolymerization product of a secondary alkyl half ester of an ethylene $\alpha,\beta$ dicarboxylic acid selected from the group consisting of maleic and fumaric acids, wherein the alkyl group contains from 4 to 12 carbon atoms, and a polymerizable vinyl compound having the structural formula: $R-CH=CH_2$, where R is a radical selected from the group consisting of phenyl, halogen substituted phenyl and methyl substituted phenyl radicals, said half ester and said vinyl compound being copolymerized in a molal ratio between 1:1 and 1:2; and a plasticizer for said butyral and copolymer.

13. A flexible base material coated on at least one surface thereof with a film comprising polyvinyl butyral; a copolymer consisting of the copolymerization product of a secondary alkyl half ester of an ethylene $\alpha,\beta$ dicarboxylic acid selected from the group consisting of maleic and fumaric acids, wherein the alkyl group contains from 4 to 12 carbon atoms, and a polymerizable vinyl compound having the structural formula:

$$R-CH=CH_2$$

where R is a radical selected from the group consisting of phenyl, halogen substituted phenyl and methyl substituted phenyl radicals, said half ester and said vinyl compound being copolymerized in a molal ratio between 1:1 and 1:2; a small proportion by weight of a compatible thermosetting resin selected from the group consisting of urea-formaldehyde resins, methyl ethers of methylol ureas; melamine-formaldehyde resins and methyl ethers of methylol melamines; and a plasticizer for said butyral and copolymer.

14. A coating composition for flexible surfaces comprising as essential film-forming materials: (1) polyvinyl butyral; and (2) a copolymer consisting of the copolymerization product of a secondary alkyl half ester of an ethylene $\alpha,\beta$ dicarboxylic acid selected from the group consisting of maleic and fumaric acids, wherein the alkyl group contains from 4 to 12 carbon atoms, and a polymerizable vinyl compound having the general formula: $R-CH=CH_2$, where R is a radical selected from the group consisting of phenyl, halogen substituted phenyl and methyl substituted phenyl radicals, said half ester and said vinyl compound being copolymerized in a molal ratio between 1:1 and 1:2; and a solvent for said film-forming materials.

GERALD R. BARRETT.

REFERENCES CITED

The following references are of record in the file of this patent:

UNITED STATES PATENTS

| Number | Name | Date |
| --- | --- | --- |
| 2,047,398 | Voss et al. | July 14, 1936 |
| 2,224,663 | Berg et al. | Dec. 10, 1940 |
| 2,279,881 | D'Alelio | Apr. 14, 1942 |
| 2,377,231 | Hayes | May 29, 1945 |
| 2,426,902 | Seymour | Sept. 2, 1947 |
| 2,453,308 | Dunlop | Nov. 9, 1948 |

FOREIGN PATENTS

| Number | Country | Date |
| --- | --- | --- |
| 466,898 | Great Britain | June 8, 1937 |